April 7, 1964   B. WENGROWSKI   3,127,959
COOLING DEVICE FOR BRAKE DRUMS AND SHOES
Filed March 12, 1962
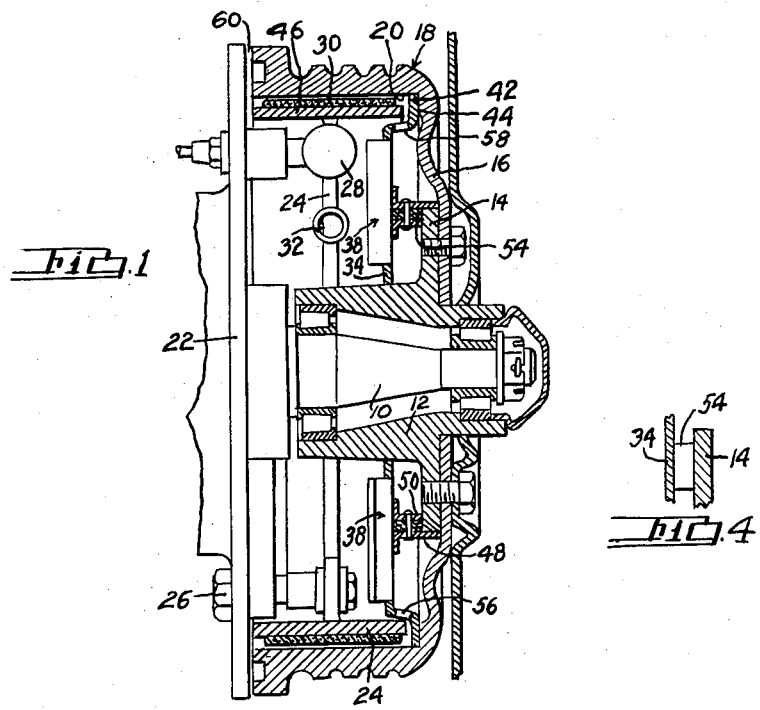
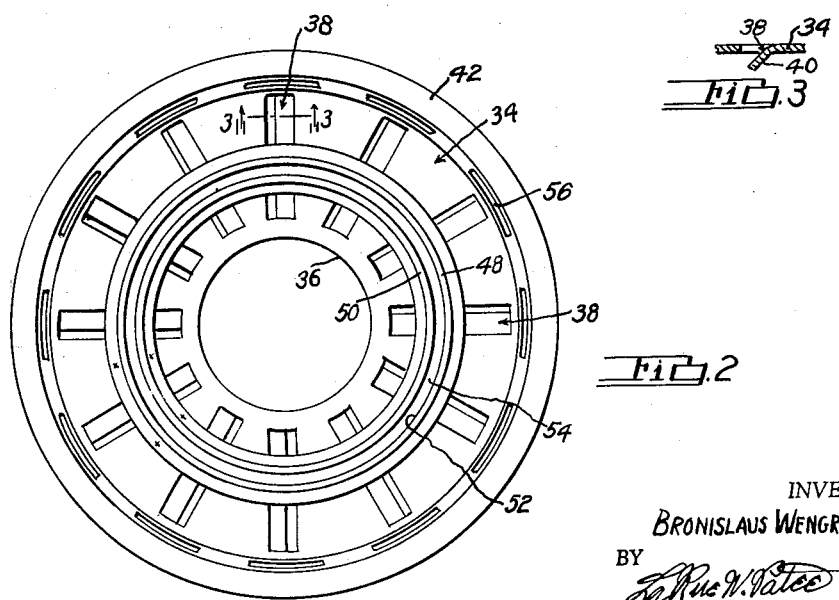
INVENTOR.
BRONISLAUS WENGROWSKI
BY
ATTORNEY

United States Patent Office 3,127,959
Patented Apr. 7, 1964

3,127,959
COOLING DEVICE FOR BRAKE DRUMS
AND SHOES
Bronislaus Wengrowski, 7729 Mettetal, Detroit, Mich.
Filed Mar. 12, 1962, Ser. No. 179,109
4 Claims. (Cl. 188—264)

This invention relates to a cooling device particularly adapted for cooling brake drums and brake shoes for automobiles.

It is common knowledge that considerable heat is generated in automobile brakes when the brake shoes are caused to frictionally engage the brake drums. This heat causes a burning of the brake shoe lining resulting in scoring of the brake shoe linings and drums.

It is an object of the present invention to provide a simple device in the form of a disc for causing a circulation of air through the brake drum and around the brake shoes for cooling the shoes and drum.

Another object of the invention is to provide a disc having a plurality of vanes which are rotatable with the drum to cause a circulation of air within and through the drum which functions as a fan.

A further object is to provide an inexpensive device which may be merchandised as an accessory applied and retained within a standard brake drum as originally manufactured without additional parts or machining.

Another object is to retain the disc to the radial plate of the drum by magnetic force.

Other objects and advantages of the invention will more fully appear from the following description taken in connection with the drawings in which:

FIG. 1 is a cross sectional view of an automobile axle showing the improved disc inserted and secured to the brake drum;

FIG. 2 is a face view of the cooling disc;

FIG. 3 is a sectional view through a portion of the disc and one of the vanes; and FIG. 4 is a view of a permanent magnet between the disc and the brake drum back plate.

Referring to the drawings, the invention has been illustrated as applied to an automobile brake mechanism. The automobile wheel is mounted on an axle 10 and a hub 12 secured to the wheel is rotatably mounted on the axle. The hub 12 is provided with a radially extending flange 14 to which the radial plate 16 of a brake drum 18 is secured. The drum 18 has an axially extending brake lining contact surface 20. The axle back plate 22 supports brake shoes 24 through anchor bolts 26 and operating mechanism for the shoes, here shown as being of the hydraulic cylinder type 28. The brake shoes 24 are provided with the usual friction lining 30. A brake shoe return spring is shown at 32. The parts thus far described are of standard automobile construction.

The improved cooling device comprises a disc 34 which is preferably formed by stamping from sheet metal material but may be of other material such as plastic or fiber. A central opening 36, substantially a sliding fit over the outer periphery of the hub 12, is formed in the disc 34. The disc 34 has an outer diameter such that it has a sliding fit with the inner periphery of the brake lining surface 20.

The body of the disc 34 is provided with a plurality of stamped out vanes 38 which form air circulating blades when the disc is rotated. One side and the two ends of a rectangular section are severed in the body portion of the disc and the metal is bent outwardly along the other side providing a diagonally extending portion 40, more clearly shown in FIG. 3. This provides a scoop for catching the air and circulating it through the drum when the disc is rotated with the drum. The outer portion of the disc extends in a radial plane offset from the radial plane of the main body portion of the disc and serves as a safety ring 42 extending between a radially extending surface 44 on the drum and the outer edge portion of the brake shoe lining supporting surface 46.

The outer circumferential edge of the disc 34 or ring 42 is located radially by the surface 20 and is located axially between the outer edge of the brake shoes 46 and the radially extending brake plate 16, thus assuring positive location of the disc and preventing interference of the air circulating vanes with the brake shoes or their operating mechanism which provides a safety feature for the mechanism.

Axially extending rings 48 and 50 are secured to a face of the disc 34 on the opposite side from the vanes 38. The ring 48 is so radially positioned on the disc that the ring slidingly fits over the outer diameter of the radially extending flange 14 and the ring 50 is radially spaced from the ring 48, the outer end of the ring 50 abutting the side face of the flange 14. These rings 48 and 50 may be spot welded to the face of the disc 34 and provide an annular groove 52 for receiving a permanent magnet 54 here shown as a rubberized magnet in the form of a ring. If desired a plurality of individual magnets may be received in the groove 52, or magnets may be arranged between the disc 34 and any place along the radial plate 16, as shown in FIG. 4.

The magnet 54 contacts the flange 14 and holds the disc 34 tightly on drum back plate 16. The disc is held against radial movement by the engagement of the safety ring 42 with the cylindrical surface 20 by the inner edge of the opening 36 engaging the outer diameter of the hub 12, and the ring 48 engaging the outer periphery of the flange 14. If for some reason, such as a sudden bump, the magnets should be dislodged from contact with the drum the safety ring 42 on the disc engages the edge 46 of the brake shoe 24 and is prevented from interference with the brake mechanism. Rotation of the drum and disc will restore the disc and magnet to the proper location without damage to the structure.

There are vent openings 56 in the axially extending portion 58 between the safety ring 42 and the main body portion of the disc 34.

When the disc 34 and drum 18 are rotating with the wheel, the vanes 38 force the air radially outwardly into contact with the drum 18 and the brake shoe 24 causing a circulation of air therebetween and through the clearance opening 60 between the back plate 22 and the outer edge of the brake drum.

The device is inexpensive to manufacture and is quickly and easily positioned within the brake drum. It may be manufactured as original equipment for automobiles, or it may be manufactured as an accessory and easily installed by the owner of a previously manufactured automobile, there being no machining or revision of parts for its successful installation and use. The wheel with the brake drum 18 is removed from its axle 10 and the disc 34 placed over the outer diameter of the wheel hub 12. The magnet 54 draws and holds the disc 34 axially of the drum by magnetic force on the back plate or the flange 14.

The invention has been illustrated and described in connection with a specific embodiment thereof, but it will be understood that various changes in the size, shape and arrangement of parts may be made without departing from the spirit thereof, and it is not my intention to limit its scope other than by a fair interpretation of the meaning of the terms in the appended claims.

I claim:

1. In an automobile braking system having a rotatable brake drum provided with a radially extending plate and an axially extending flange carried by said axially extending plate, brake shoes movable toward and away from the inner periphery of the axially extending flange of said brake drum and having their outer edges spaced axially from the radially extending plate of said brake drum, mechanism for moving said brake shoes toward and away from the axially extending flange of said brake drum, a disc plate having an outer diameter equal to a sliding fit with the inner periphery of the flange carried by said brake drum and extending between the outer edges of said brake shoes and radially extending plate of said brake drum, vent openings in said disc plate and air circulating vanes on a side face of said disc plate facing said brake shoes for circulating air in said brake drum, and permanent magnetic means carried on the side of said disc plate facing the radially extending plate of said brake drum for contact engagement with the radially extending plate of said brake drum for retaining said disc plate to said brake drum.

2. An accessory for automobile brake mechanism, comprising a circular disc plate having a main centrally apertured body portion and an offset ring portion, spaced axially from the main body portion, an axially extending portion connecting said main body portion and said ring portion, vent openings in said axially extending portion, air circulating vanes on a side face of said main body portion and on the opposite side to said offset ring portion, and permanent magnetic means on the same side of said main body portion as said offset portion for securing said disc to a rotatable support.

3. An accessory for automobile brake mechanism, comprising a circular disc plate having a main centrally apertured body portion and an offset ring portion spaced axially from the main body portion, an axially extending portion connecting said main body portion and said ring portion, vent openings in said axially extending portion, air circulating vanes on a side face of said main body portion and on the opposite side to said offset ring portion, a pair of spaced cylindrical axially extending flanges carried by said main body portion on the same side of said main body portion as said ring portion is located, and permanent magnetic means located in the space between said axially extending flanges for securing said disc to a rotatable support.

4. A vehicle brake comprising, a rotatable brake drum having an inner axially extending peripheral surface, a back plate for said brake drum having a radial surface extending at right angles to the inner peripheral surface of said brake drum, brake shoes having axially extending friction surfaces movable into and out of frictional engagement with the inner peripheral surface of said brake drum, the circumferential edge of said brake shoes adjacent said back plate spaced from the radial surface on said back plate, a disc plate having a radially extending main body portion which is centrally apertured and extends radially within the confines of the opposite circumferential edges of the axially extending friction surfaces of said brake shoes, an axially offset ring carried by one face of said main body portion extending radially between the circumferential edge of said brake shoes and the radial surface of said back plate, air circulating vanes formed on the side face of said main body portion opposite to the side having said axially offset ring, the outer periphery of said offset ring having a sliding fit with the inner periphery of the axially extending portion of said brake drum, and only permanent magnetic means carried by said disc plate for holding said disc plate to said back plate.

References Cited in the file of this patent

UNITED STATES PATENTS

| | | |
|---|---|---|
| 2,048,420 | Babel | July 21, 1936 |
| 2,695,950 | Zingone | Nov. 30, 1954 |
| 2,837,376 | Bruno | June 3, 1958 |
| 3,023,858 | Yocom | Mar. 6, 1962 |

FOREIGN PATENTS

| | | |
|---|---|---|
| 229,889 | Great Britain | Mar. 5, 1925 |
| 1,226,608 | France | Feb. 29, 1960 |